United States Patent [19]
Escartin

[11] Patent Number: 6,008,692
[45] Date of Patent: Dec. 28, 1999

[54] CARRIER WAVE SYNCHRONIZATION FOR MULTI-LEVEL TWO-DIMENSIONAL MODULATION ALPHABETS

[75] Inventor: Marko Escartin, Espoo, Finland

[73] Assignee: Nokia Technology GmbH, Pforzheim, Germany

[21] Appl. No.: 08/916,914

[22] Filed: Aug. 15, 1997

[30] Foreign Application Priority Data

Aug. 26, 1996 [FI] Finland ..................................... 963317

[51] Int. Cl.$^6$ .................................................. H04L 27/38
[52] U.S. Cl. ......................... 329/307; 375/327; 375/326; 375/264; 375/261; 455/265
[58] Field of Search .................... 375/326, 327, 375/264, 261; 329/307, 306, 309; 455/260, 263, 265; 348/726, 735

[56] References Cited

U.S. PATENT DOCUMENTS

| | | | |
|---|---|---|---|
| 5,600,672 | 2/1997 | Oshima et al. | 375/219 |
| 5,621,767 | 4/1997 | Brandt et al. | 375/344 |

Primary Examiner—Arnold Kinkead
Attorney, Agent, or Firm—Ware, Fressola, Van Der Sluys & Adolphson LLP

[57] ABSTRACT

In a method for realizing carrier wave synchronization in the receptio of a multi-level, two-dimensional modulation signal, the received signal is demodulated by using at least one local oscillator (3) in order to generate the local oscillator frequency. In the method, the local oscillator (3) performs a frequency scanning within the frequency range of the reception; during the frequency scanning, a demodulated signal point system is formed of the received signal by using the frequency generated by the local oscillator (3). Furthermore, the demodulated signal point system in the method is examined in order to determine at which point of time the frequency of the local oscillator is synchronized to the carrier wave frequency of the received modulation signal.

7 Claims, 6 Drawing Sheets

CARRIER WAVE SYNCHRONIZATION FOR MULTI-LEVEL TWO-DIMENSIONAL MODULATION ALPHABETS

TECHNICAL FIELD

The present invention relates to a method for performing carrier wave synchronization in the reception of a multi-level, two-dimensional modulation signal, wherein the received signal is demodulated by using at least one local oscillator to generate the local oscillator frequency. The invention also relates to a demodulator according to the described method.

BACKGROUND OF THE INVENTION

A problem in the reception of multi-level modulated signals is that the carrier wave is difficult to regenerate, because the modulated, received signal does not contain a real, unmodulated carrier wave. The effective information in a multi-level modulation, such as that of 64-QAM (Quadrature Amplitude Modulation) and 256-QAM, deforms the carrier wave phase at random to so many possible angles that in most prior art synchronization methods the effective information itself disturbs the estimation of the carrier wave phase (self-noise). The larger the employed modulation alphabet, the worse the problem generally becomes.

A prior art carrier wave synchronization method is based on the raising to a power of the received signal, as well as on filtration. Among the drawbacks of this method in the reception of multi-level modulated signals, is the fact that the carrier wave synchronization signal to be generated contains a strong insignificant part and weak useful part. The useful part describing the phase error is made available with a dense but slow filtration (a kind of averaging). If the frequency error between the local oscillator frequency and the carrier wave is significant, the phase error may change during the averaging to such an extent that the synchronizing signal is not kept up to date; it may exchange its sign, vibrate or be eliminated through averaging.

Another prior art carrier wave synchronization method is based on a process of detecting the transmitted data symbols from the received signal by applying certain decision-making criteria. Such methods are mainly designed for phase tracking after the receiver is locked to the carrier wave. An example of this kind of solution is DDL (Decision Directed feedback Loop). In carrier wave synchronization, this type of solutions based on decision-making can finction with extremely low modulation alphabets, such as BPSK (Bi Phase Shift Keying) and QPSK (Quadrature Phase Shift Keying). In order to ensure a sufficiently reliable operation, the error ratio in the decision-making is typically 1:100. In multilevel modulations an error ratio of this order means that the demodulated signal point system remains more or less inside the decision-making grid and is not allowed to rotate, as is illustrated in FIG. 1a. With multi-level modulation alphabets, such solutions are applicable mainly in the correction of the phase error in a situation where the frequency is corrected, in other words when the local oscillator frequency is locked to the carrier wave frequency.

SUMMARY OF THE INVENTION

The object of the present invention is to realize a method and apparatus for accomplishing carrier wave synchronization and phase synchronization in the reception of multi-level modulated signals. The invention is based on the idea that frequency scanning is performed with a local oscillator over the frequency range wherein the carrier wave of the signal to be received is assumed to be located. During the frequency scanning, the demodulated signal point system is monitored in order to observe the point of time when the frequencies of the local oscillator and the carrier wave essentially correspond to each other. At that point, the frequency scanning is stopped. The carrier wave frequency used in the received modulation signal is then determined on the basis of the frequency of the local oscillator at the moment of stopping. The frequency definition can be further narrowed down by performing a second frequency scanning within a narrower frequency range in the vicinity of the carrier wave frequency. By applying the described method, the frequency of the local oscillator is adjusted precisely to correspond to the carrier wave frequency, and the phase error can be estimated very accurately. After performing the frequency locking and the coarse phase locking, there can be activated a regular decision feedback phase correction/tracking circuit known as such.

The demodulated signal point system rotates when the frequency of the local oscillator is not equal to the carrier wave frequency of the demodulated signal. This situation is illustrated in FIG. 1b. During a frequency scanning, the rotation of the signal point system stops when the frequency of the local oscillator corresponds to the carrier wave frequency. This situation is illustrated in FIG. 1a. The rotation is reversed after the local oscillator has exceeded the correct frequency. When the local oscillator frequency is approaching the correct value, the demodulated signal point system turns so slowly that within a limited period of observation, the characteristic form of the constellation can be perceived in the signal point system. Naturally the rotating signal point system is circularly symmetrical.

Consequently, on the basis of the demodulated signal point system, it is possible to define when the frequency of the local oscillator is essentially equal to the carrier wave frequency of the demodulated signal.

The invention offers significant advantages compared to the methods and receivers of the prior art. The method according to the invention can advantageously be used for correcting the frequency and the phase of a local oscillator. Furthermore, the method according to the invention finctions with multi-level signal point systems, especially with two-dimensional constellations. The invention is most advantageously applied in such signal point systems that are not circularly symmetrical, but the invention can also be adapted to circularly symmetrical signal constellations, if there is found a geometrical property that changes as the result of rotation or non-rotation. The hardware according to the invention is carried out in a simple fashion, with a few logic circuits.

Another advantage of the invention is that it can also be applied in the synchronization of a signal with echo, which facilitates the elimination of echoes from the received signal.

BRIEF DESCRIPTION OF THE DRAWINGS

The invention is described in more detail below, with reference to the appended drawings, wherein.

BEST MODE FOR CARRYING OUT THE INVENTION

Figure 2B:
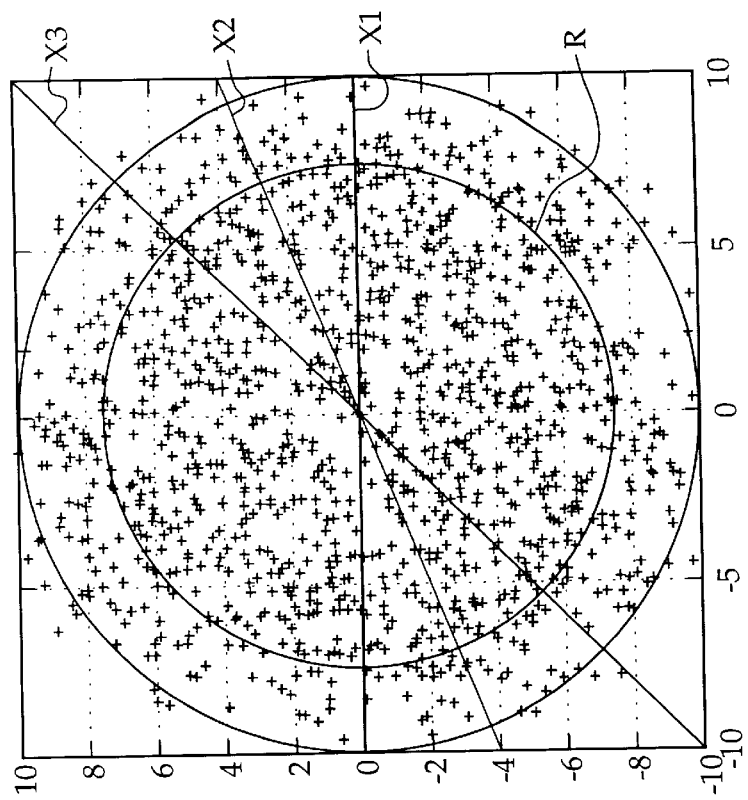
FIG. 2b illustrates a rotating signal point system with echo.
Figure 2A:
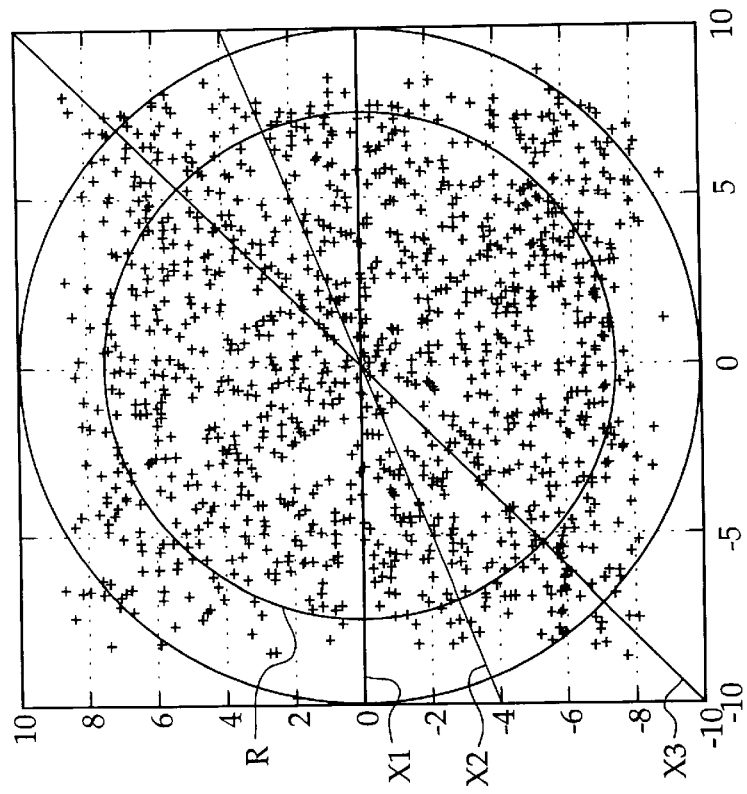
FIG. 2a illustrates a non-rotating signal point system with echo.
Figure 3:
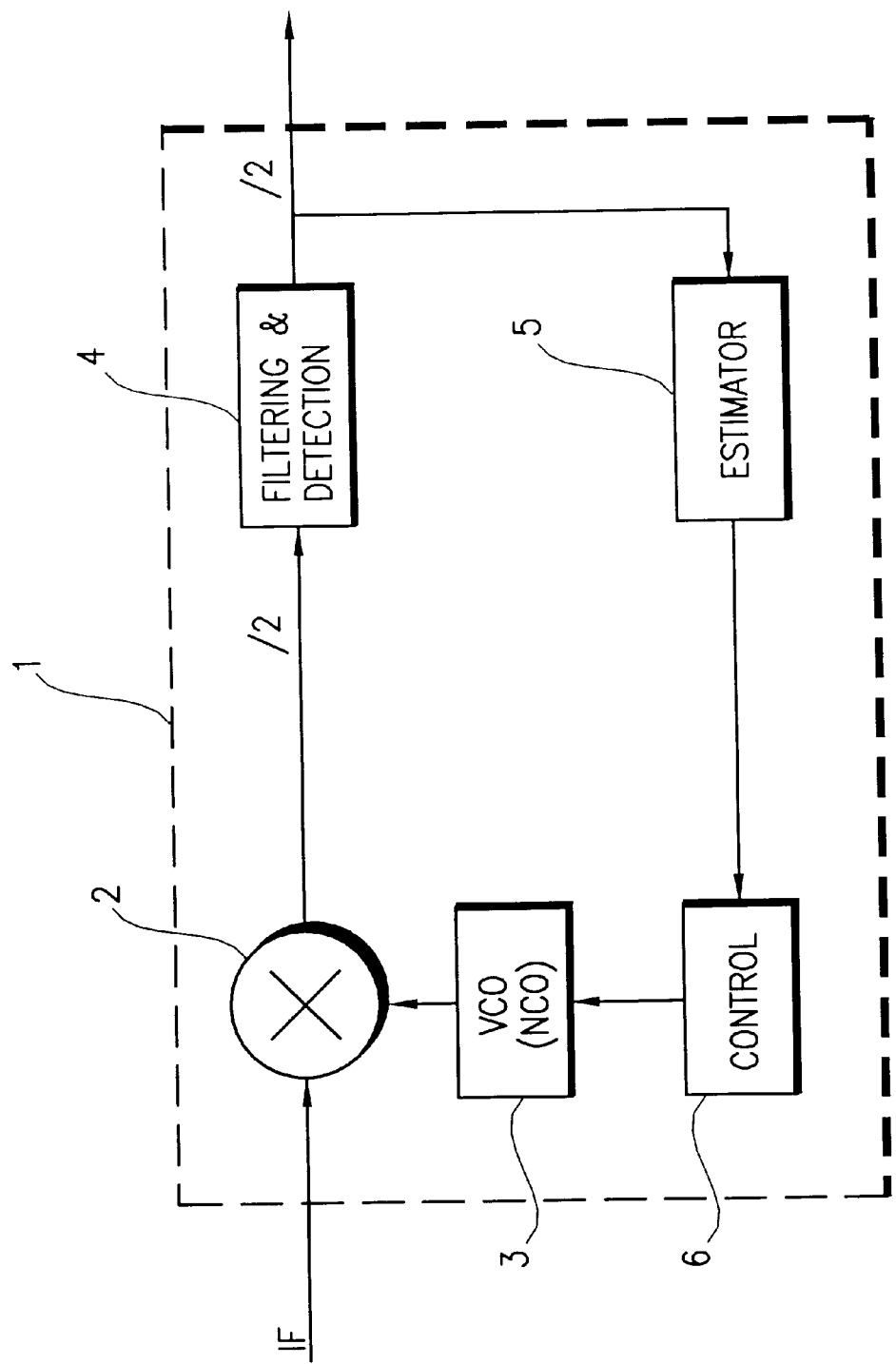
FIG. 3 is a simplified block diagram illustrating the location of the estimator circuit according to the invention in the demodulator.

The invention is further illustrated with reference to the following example, where the signal to be received is a multi-level, two-dimensionally modulated signal (M-QAM); the block diagram of FIG. 3 is also referred to. The received signal is conducted, through high frequency and possibly intermediate frequency blocks (not illustrated) to a mixer 2 of the demodulator 1. Into the second mixer input, there is conducted a frequency generated by the local oscillator 3. From the mixer output, the signal is fed into a filtering and detection block 4. The filtered and detected signal is conducted to an estimator 5, where three different projections of the demodulated signal are calculated on axes that are positioned at angles of 0°, 22.5° and 45° with respect to the real axis (x-axis). In FIGS. 1a–2b, the projection axis corresponding to 0° is indicated with the reference number x1. Respectively, reference number x2 is used for indicating the second projection axis which is positioned at an angle of 22.5° with respect to the first projection axis, and reference number x3 is used for indicating the third projection axis positioned at an angle of 45° with respect to the first projection axis x1. In FIGS. 1a–2b, the demodulated signal point system is indicated with + signs. At the transmission stage, the demodulated signal point system illustrated in FIGS. 1a–2b is modulated by 64-QAM modulation comprising 64 symbols, each of which corresponds for instance to a 6-bit binary string (000000-111111). At the reception stage, the demodulated signal points are advantageously interpreted by means of a decision-making grid. FIG. 1a shows a decision-making grid formed of horizontal and vertical dotted lines, wherein a square formed by two adjacent horizontal and vertical lines represents an area where a detected demodulated signal point is interpreted as a symbol (bit string) corresponding to said area. There are 64 such areas available.

The frequency error of the local oscillator results in that the received and demodulated signal point may be interpreted incorrectly. Multi-level modulation and demodulation as such represent prior art technology known to a man skilled in the art, wherefore it is unnecessary to describe it in more detail here. The absolute value of the calculated projection is compared with a suitably chosen threshold value, and the distribution of the projected point system is compared in the case of each chosen axis on both sides of the threshold value. A chosen threshold value is represented as the circle R in FIGS. 1a–2b. In this case for instance from FIG. 1a it is observed that the demodulated signal points projected onto the first projection axis x1 are located in the area that remains inside the threshold value circle R of the first projection axis, i.e. the threshold value is not exceeded with any value of the demodulated signal point. On the other hand, part of the demodulated signal points projected onto the second projection axis x2 and onto the third projection axis x3 are located outside the threshold value circle R, too.

Figure 1B:
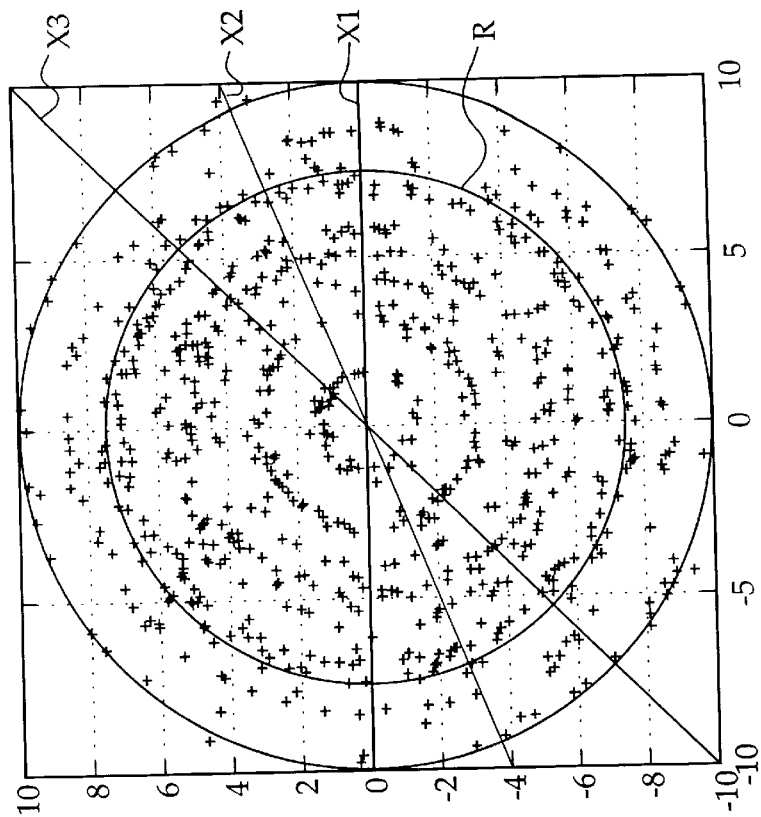
FIG. 1b illustrates a corresponding rotating signal point system.
Figure 1A:
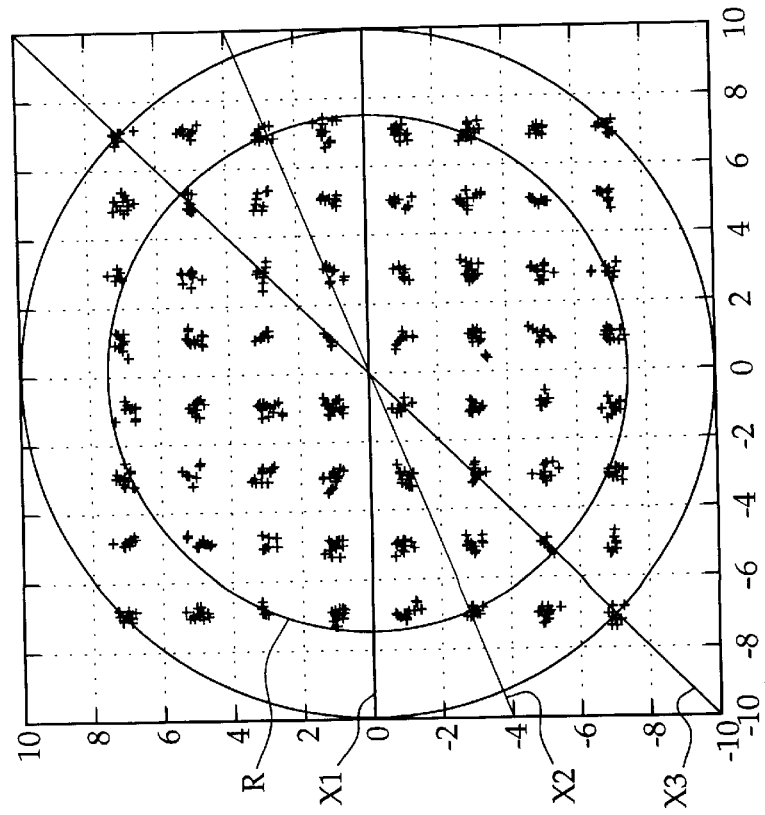
FIG. 1a illustrates a non-rotating 64-QAM signal point system as demodulated without frequency error.

In the case of the rotating signal point system illustrated in FIG. 1b, part of the demodulated signal points projected onto the first projection axis x1 are also located in the area remaining outside the threshold value circle R of the first projection axis x1. Likewise, some of the demodulated signal points projected to the second projection axis x2 and to the third projection axis x3 are also located outside the threshold value circle R. The distributions of the projected demodulated signal points surpassing the threshold value circle R on the first x1, on the second x2 and on the third x3 projection axis are roughly equal between each other. If the average distributions on all three projection axes are the same, the demodulated point system is circularly symmetrical, i.e. it rotates owing to the frequency error. If one of the three distributions differs in that the threshold value is not exceeded, or it is exceeded less than with the other axes in average, the estimator 5 estimates that the frequency is correct. After this the frequency scanning can be repeated more accurately, so that the estimate minimum is obtained on the zero axis, in which case the angle error in the signal point system phase can be eliminated, too. As an alternative, the phase error can be corrected by multiplication (phase rotator) when it is known at which angle the minimum of the estimate is obtained (0°, 22.5°, 45°).

The method according to the invention also finctions with an input signal with echo, because the geometry of the demodulated signal point system is maintained irrespective of the echoes, so that the estimator according to the invention detects the point of time when the frequency of the local oscillator corresponds to the carrier wave frequency of the received signal. An input signal with echo is illustrated in FIG. 2a, where the frequency of the local oscillator is synchronized to the carrier wave frequency, and in FIG. 2b, where the signal point system rotates, i.e. the frequency of the local oscillator 3 is not correct.

Figure 4:
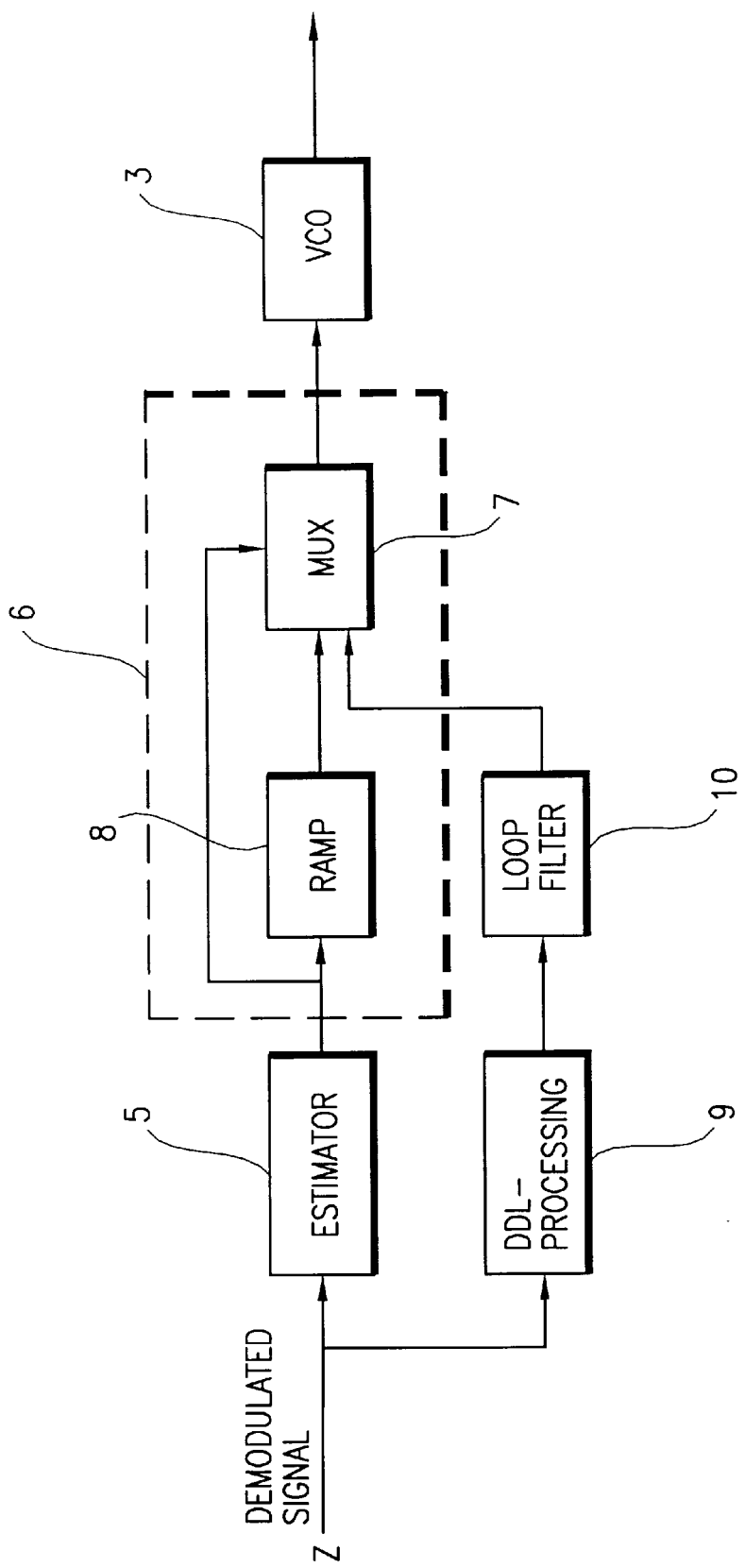
FIG. 4 is a simplified block diagram illustrating a preferred embodiment of the feedback branch of FIG. 3.

FIG. 4 is a simplified block diagram illustrating a preferred embodiment of the feedback branch 5, 6, 3 of the demodulator 1 according to the invention. The coupling is carried out so that the estimator 5 controls the selection circuit 7, which selection circuit 7 selects as an output signal the signal generated by the ramp generator 8. The ramp generator 8 generates an evenly changing signal, advantageously a voltage signal, in which case the output frequency of the local oscillator 3 changes smoothly. Advantageously the employed local oscillator 3 is a voltage controlled oscillator (VCO), in which case the control signal is a voltage signal, i.e. the ramp generator 8 generates an evenly changing voltage signal. After the estimator 5 has detected frequency locking, the control signal of the local oscillator 3 is stopped at the value prevailing at the lock-in moment, or the shift rate of the signal of the ramp generator 8 is slowed down, and the direction of the shift (growing/decreasing) is reversed in order to obtain a more accurate frequency definition. The signal indicating the phase locking controls the selection circuit 7 so that the signal of a DDL phase controller 9 or that of another sensitive phase controller is conducted to the output of the selection circuit 7 in order to control the local oscillator 3. Now the local oscillator 3 is synchronized to the carrier wave frequency of the signal to be received.

Figure 5:
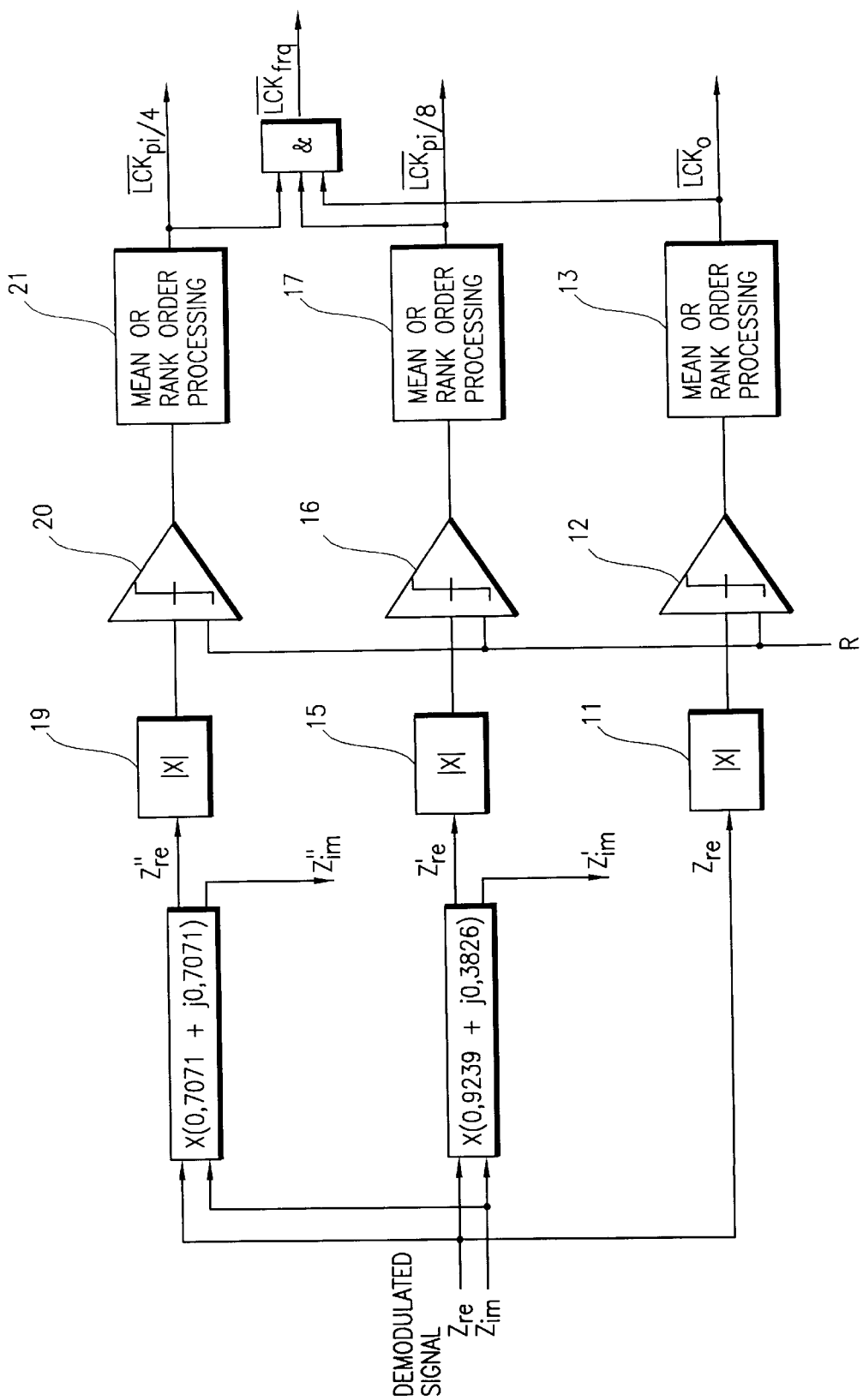
FIG. 5 is a simplified block diagram illustrating an estimator structure suitable to quadratic signal point systems, such as the QAM signal point system.

FIG. 5 is a simplified block diagram illustrating an estimator 5 suited for quadratic signal point systems, such as the 64-QAM constellation. The estimator 5 comprises three signal branches, the first branch 11, 12, 13 of which forms a projection onto the first projection axis x1, the second signal branch 14, 15, 16, 17 forms a projection of the signal point system onto the second projection axis x2, and the third signal branch 18, 19, 20, 21 forms a projection of the signal point system onto the third projection axis x3. The received demodulated signal is fed to each signal branch. In the first signal branch 11, 12, 13, a projection is formed of the signal points onto the first projection axis, in this embodiment onto the axis x. In the projection, the real value of the signal points is extracted, and its absolute value is formed in a first absolute value block 11. In a first comparator 12, the absolute value is compared with the threshold value R. As the output of the first comparator 12, there is obtained a binary signal, wherein the first value corresponds to a case where the absolute value is smaller than the threshold value, and the second value corresponds to a case where the absolute value is higher than the threshold value. Advantageously the first value is a logic zero, i.e. the voltage is about 0 volts, and the second value is a logic 1, i.e. roughly the voltage value corresponding to the operating voltage. The output of the first comparator 12 is conducted to a first averaging block 13, where an average or other rank order processing is formed of the output in order to estimate the distribution of the signal point system that has been projected onto the first projection axis x1. In the second signal branch the phase of the demodulated signal is advantageously turned 22.5° ($\pi/8$) with the first phase inversion circuit 14, whereto is fed the first phase inversion value which is a complex value $e^{j\pi/8}=0.9239+j0.3826$ (corresponds to a phase inversion of 22.5 degrees). Particularly in a digital implementation, the first phase inversion circuit 14 is advantageously a multiplier circuit. In that case the projection of the signal point system onto the second projection axis x2 is obtained by extracting the real parts of the output signal of the first phase inversion circuit 14 and by conducting them to a second absolute value block 15. In the second absolute value block 15, the absolute values of the projected signal points are formed, and they are fed to a second comparator 16. The operation of the second comparator 16 corresponds to the operation of the first comparator 12. The output signal of the second comparator 16 is fed to a second averaging block 17, where there is formed an estimate of the distribution of the data received onto the second projection axis x2.

The third signal branch comprises a second phase inversion member 18, a third absolute value block 19, a third comparator 20 and a third averaging block 21. The operation of the third signal branch corresponds in all essential aspects to the operation of the second signal branch; with the exception that onto the second phase inversion member 18, there is fed a phase inversion value which is a complex value $e^{j\pi/4}=0.7071+j0.7071$ (corresponds to a phase inversion of 45 degrees), in which case the phase difference with respect to the first phase inversion frequency is 22.5°, and with respect to frequency of the first signal branch 45°.

In this preferred embodiment, the obtained output of the first averaging block 13 is a down-active signal, i.e. a logic 0 when the received signal point system is at the same phase with respect to the first projection axis xl, i.e. at a phase angle of 0°. Respectively, the output $LCK_{\pi/8}$ of the second averaging block 17 obtains the value 0 when the demodulated signal point system is at the phase angle 22.5° with respect to the first projection axis x1. The output $LCK_{\pi/4}$ of the third averaging block 21 obtains the value 0 when the demodulated signal point system is at a phase angle of 45° with respect to the first projection axis x1. The outputs $LCK_0$, $LCK_{\pi/8}$, $LCK_{\pi/4}$ of the averaging blocks 13, 17, 21 are conducted to an AND circuit 22. The employed output of the AND circuit is a down-active signal, in other words the output $LCK_{frq}$ of the AND circuit 22 obtains the value 0 when the demodulated signal point system is locked to one of the phases 0°, 22.5° and 45°. The lock-in signals $LCK_0$, $LCK_{\pi/8}$, $LCK_{\pi/4}$, $LCK_{frq}$ can be used together or separalety for indicating the lock-in mode and for detecting a possible phase error. In the control block, control is established on the basis of these phase signals, for instance for the selection circuit 7 in order to direct the local oscillator 3.

Figure 6:
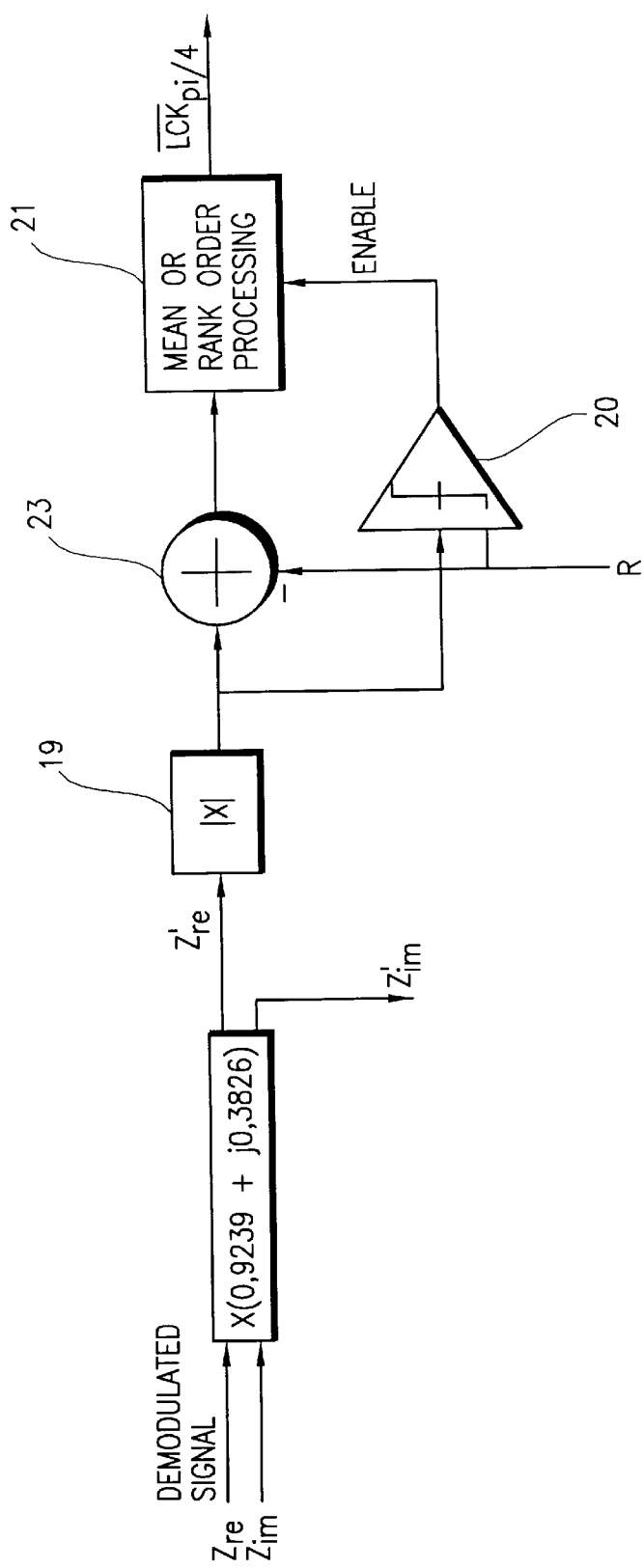
FIG. 6 is a simplified block diagram illustrating an alternative realization of one branch of FIG. 5 in an estimator suited for quadratic signal point systems.

FIG. 6 shows an alternative embodiment for the signal branches of FIG. 5. FIG. 6 illustrates the third branch, but the rest of the signal branches are carried out in a similar fashion. In this second embodiment, the signal generated by the third absolute value block 19 is conducted, apart from the third comparator 20, to a summing-up unit 23, where the threshold value R is reduced from the absolute value. The signal generated by the summing-up unit 23 is fed to the third averaging block 21. In this embodiment, the output signal of the third comparator 20 is used for activating the third averaging block 21 in a case where the absolute value exceeds the chosen threshold value R. Consequently, in this embodiment a signal point exceeding the threshold value is weighted with the difference of the absolute value and threshold value of the projection point, in which case the received estimate is more sensitive to differences in the distribution of the signal point system.

The demodulator 1 according to the invention is advantageously used in the demodulator circuits of digital TV sets in order to achieve a reception with less interference. The invention can also be used in other applications, where large frequency deviations may appear in between the carrier wave and the local oscillator frequency of the receiver.

The invention is not restricted to the above described embodiments only, but it can be modified within the scope of the appended patent claims.

I claim:

1. A method for achieving carrier wave synchronization in the reception of a multi-level, two-dimensional modulation signal, wherein the received signal is demodulated by using at least one local oscillator (3) to generate a local oscillator signal, the at least one local oscillator signal having a frequency and also having a phase relative to the carrier wave, the method characterized in that the at least one local oscillator (3) is made to perform a first frequency scan of a frequency range, the at least one local oscillator thereby being made to oscillate at any time during the frequency scan at a frequency in a set of frequency values spanning the frequency range, the received signal is used to build up, over time, a demodulated signal point system by using the local oscillator signal to demodulate the received signal and to thereby provide individual signal points of the demodulated signal point system, the individual signal points being accumulated over time so as to indicate the demodulated signal point system based upon the at least one local oscillator signal used, and the demodulated signal point system is examined in order to determine the point of time when the frequency of the at least one local oscillator is at least approximately the frequency of the carrier wave so that the at least one local oscillator is at least approximately synchronized to the carrier wave of the received modulation signal.

2. A method according to claim 1, characterized in that the examining of the demodulated signal point system in order to determine the point of time when the frequency of the at least one local oscillator is at least aporoximately the frequency of the carrier wave, comprises the steps of:

creating projections of the demodulated signal point systems onto two or more projection axes (x1, x2, x3), choosing a threshold value (R), estimating, on each projection axis (x1, x2, x3), the distribution of those signal points that exceed a chosen threshold value (R), and determining as the point of time when the frequency of the local oscillator is at least approximately the frequency of the carrier wave, the point of time when the distribution on one projection axis essentially differs from the rest of the projection axes.

3. A method according to claim 2, characterized in that in the method, there also is performed another frequency scanning with the local oscillator (3) in the vicinity of the frequency detected on the basis of the first frequency scanning, within a frequency range which is narrower than that of the first frequency scanning, in which case the carrier wave synchronization is performed more accurately.

4. A method according to claim 2, characterized in that the estimated distribution on different projection axes is used for correcting the phase difference between the local oscillator frequency and the carrier wave frequency.

5. A demodulator (1) for demodulating a received multi-level, two-dimensional modulation signal modulated by a carrier wave, said demodulator (1) comprising a mixer (2), a local oscillator (3) for generating a local oscillator signal, the local oscillator signal having a frequency and also having a phase relative to the carrier wave, and means for accomplishing the carrier wave synchronization, characterized in that the means for accomplishing the carrier wave synchronization comprise:

means (6) for performing a scan of frequencies in a frequency range with the local oscillator (3), the local oscillator thereby being made to oscillate at any time during the frequency scan at a frequency in a set of frequency values spanning the frequency range, means (2,4) for building us, over time, a demodulated signal point system using the local oscillator signal to demodulate the received signal and to thereby provide individual signal points of the demodulated signal point system, the individual signal points being accumulated over time so as to indicate the demodulated signal point system based upon the local oscillator signal used, and means (5) for examining the demodulated signal point system in order to determine the point of time when the frequency of the local oscillator is at least approximately the frequency of the carrier wave so that the local oscillator is at least approximately synchronized to the carrier wave of the received modulation signal.

6. A demodulator (1) according to claim 5, characterized in that the means for examining the demodulated signal point system comprise two or more signal branches, in which case the demodulated signal appears at different phases in the different signal branches.

7. A method according to claim 1, characterized in that in the method, there also is performed another frequency scanning with the local oscillator (3) in the vicinity of the frequency detected on the basis of the first frequency scanning, within a frequency range which is narrower than that of the first frequency scanning, in which case the carrier wave synchronization is performed more accurately.

* * * * *

UNITED STATES PATENT AND TRADEMARK OFFICE
CERTIFICATE OF CORRECTION

PATENT NO : 6,008,692
DATED : December 28, 1999
INVENTOR(S) : Marko Escartin

It is certified that error appears in the above-identified patent and that said Letters Patent hereby corrected as shown below:

In the Abstract at INID [57], line 2, delete "receptio" and substitute --reception--.

At column 7, line 5, after "determining", insert --,--.

At column 8, line 4, delete "us" and substitute --up--.

Signed and Sealed this

Twelfth Day of September, 2000

Attest:

Q. TODD DICKINSON

*Attesting Officer*        *Director of Patents and Trademarks*